United States Patent Office

3,059,191
Patented Oct. 16, 1962

3,059,191
INVERTER NETWORK
Frank J. Hierholzer, Jr., Westport, Conn., and Paul F. Pittman, Pittsburgh, Pa., assignors to Westinghouse Electric Corporation, East Pittsburgh, Pa., a corporation of Pennsylvania
Filed Jan. 19, 1960, Ser. No. 3,304
11 Claims. (Cl. 331—113)

This invention relates to inverter networks for transforming unidirectional potential to alternating potential and more specifically to control circuits for such a network. Certain features shown in this application are shown and claimed in a copending application of F. J. Hierholzer, Jr., one of the joint applicants hereof, Serial No. 3,303, filed January 19, 1960, for Inverter Network and assigned to the same assignee as is this application.

An object of this invention is to provide an improved circuit for controlling semiconductor switches of an inverter network.

A further object is to provide such a circuit which will be fast and positive in its operation.

A still further object is to provide such a circuit which will compensate for individual differences in the circuit elements.

Another object is to provide such a circuit in which the length of the half cycles of one polarity may be varied with respect to the length of the half cycle of the opposite polarity.

Other objects will be apparent from the specification, the appended claims and the drawings, in which drawings:

Figure 1:
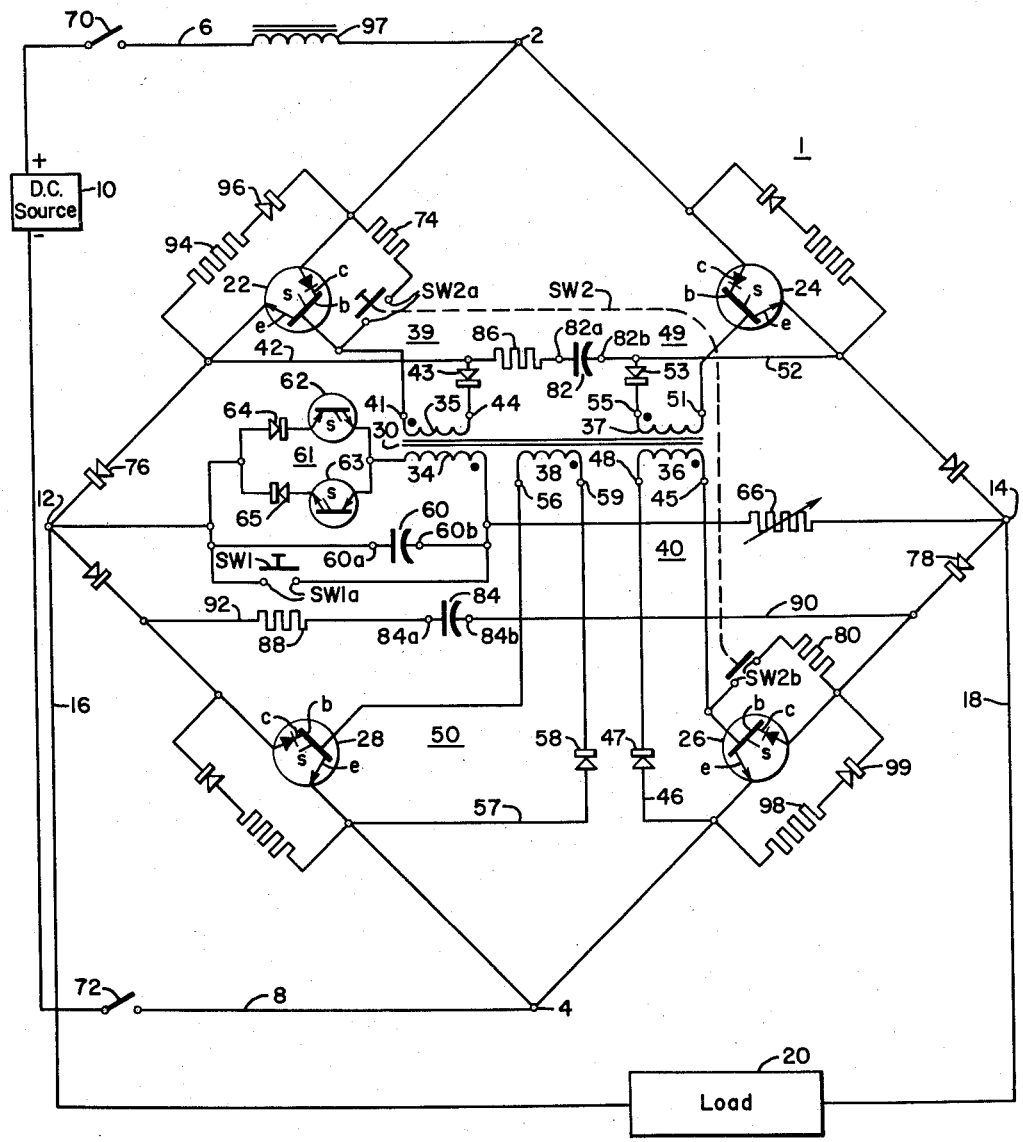
FIGURE 1 is a schematic view showing an inverter network embodying the invention.

Referring to the drawings by characters of reference, the numeral 1 indicates generally a bridge type inverter network having power supplying terminals 2 and 4 connected by means of conductors 6 and 8 to a suitable source of unidirectional potential 10. The bridge type network 1 has a pair of output terminals 12 and 14 which are connected by conductors 16 and 18 respectively to an alternating current load 20.

Current flow through each of the bridge arms is controlled by means of four layer triodes 22, 24, 26 and 28 as described in said copending application. The triodes 22 and 24 respectively control current flow from the power terminal 2 to the output terminals 12 and 14 while the triodes 26 and 28 similarly control the current flow from the output terminals 12 and 14 to the power terminal 4. Each of the triodes 22, 24, 26 and 28 has a power circuit extending between a current input terminal or emitter *e* through four semiconductor layers to a current output terminal or collector *c*. Current flow through the triode is controlled by means of a control circuit which extends from the power terminal *e* to a control terminal or electrode *b*.

The triodes as illustrated are semiconductor devices in which the control circuit acts to control the rendering of the power circuit into its conducting condition but has no effect (under normal operating conditions) to interrupt the current flow in the power circuit. Current through the power circuit of such a triode is interrupted only when the magnitude of the current flow therethrough decreases below a minimum critical value. In this respect it is very much like a thyratron or ignitron tube.

Four layer triodes also have other operating characteristics which if the invention is to be understood must be considered. A detailed discussion of these characteristics may be found in the above-mentioned copending application and for the purposes of this application it is sufficient to understand that the control current must be maintained for a minimum critical period in order to permit the triode to become thoroughly conductive. At the end of this time the base or control current may be terminated without interfering with further conduction of the triode which triode will then continue to conduct as long as the current flow therethrough does not decrease below a minimum critical value. This value is a characteristic of a partciular triode.

When it is desired to turn off the triode current flow therethrough it is terminated for a critical time period known as the "turn-off" period after which the triode will act as an open switch in the circuit as disclosed in said copending application. During the turn-off time period, a finite time is required for the carriers to reform in the triode and during this time the forward current therethrough must remain substantially zero and the voltage thereacross must remain below a critical predetermined value.

Returning again to the circuit arrangement of FIG. 1 the collectors *c* of the triodes 22 and 24 are connected to the power terminal 2 while the emitters *e* thereof are connected to the load terminal 12 and 14 respectively. The collectors *c* of the triodes 26 and 28 are connected respectively to the output terminals 14 and 12 while the emitters *e* of these triodes are each connected to the power terminal 4. The pairs of triodes 22—26 and 24—28 are alternately rendered conducting for energizing the output terminal 12 and 14 in one polarity and then in the opposite polarity from the source 10 to provide a source of alternating potential to the load 20.

In order to accomplish the rendering conductive or turning on of the pairs of triodes 22—26 and 24—28 a firing or control transformer 30 is provided. The transformer 30 has a primary winding 34 and four secondary windings 35, 36, 37 and 38. The secondary windings 35 and 36 are connected in the control circuits 39 and 40 of the triodes 22 and 26 respectively. The control circuit 39 extends from one terminal 41 of the winding 35 through the base *b* of the triode 22, the emitter *e* thereof, a conductor 42 and a rectifier 43 of the other terminal 44 of the winding 35. Similarly the control circuit 40 extends from one terminal 45 of the winding 36 through the base *b* of the triode 26, the emitter *e* thereof, a conductor 46 and a rectifier 47 to the other terminal 48 of the winding 36. The rectifiers 43 and 47 prevent reverse current flow through the circuits 39 and 40.

The windings 37 and 38 are similarly connected in the control circuits 49 and 50 of the triodes 24 and 28. Control circuit 49 extends from one output terminal 51 of the winding 37 through the base *b* of the triode 24, the emitter *e* thereof, a conductor 52 and a rectifier 53 to the other terminal 55 of the winding 37. The control circuit 50 extends from one terminal 56 of the winding 38 through the base *b* of the triode 28, the emitter *e* thereof, a conductor 57 and a rectifier 58 to the other terminal 59 of the winding 38.

The primary winding 34 of the timing transformer 30 is connected across a timing capacitor 60 in series with a control network 61 comprising a four layer diode 62 and 63 and rectifier 64 and 65. The diode 62 and rectifier 64 are connected in series to form one leg of one parallel branch of the network 61 while the diode 63 and rectifier 65 are series connected to form the other leg or branch of this network 61. The diodes 62 and 63 and rectifiers 64 and 65 are so poled that one of the legs of the network 61 conducts to discharge the capacitor 60 when charged to a critical value in a first polarity and the other of the network legs conducts to discharge the capacitor 60 when charged to a critical value in the opposite direction.

One terminal 60a of the timing capacitor 60 is connected to the output terminal 12 while the other terminal 60b thereof is connected through a variable timing resistor 66 to the other output terminal 14. Upon energization of the output terminals 12 and 14, in a manner to be described below, the timing capacitor 60 will charge at a predetermined rate depending upon the setting of the variable resistor 66. This charging of the capacitor 60 may be in either polarity depending upon the relative polarity of the terminals 12 and 14. When the capacitor 60 reaches a predetermined potential, one of the diodes 62 or 63 depending upon the polarity of the charge on the timing capacitor 60, will breakover and the timing capacitor 60 will discharge through the primary winding 34 of the firing transformer 30. When this occurs, all of the windings 35 through 38 of the transformer 30 will, of course, be energized. However, the rectifiers 43, 47, 53 and 58 are so polarized that only the networks 39—40 or 49—50 will conduct current and only the triodes 22—26 or 24—28 will be rendered conducting.

If the terminal 60a of the capacitor 60 was positive with respect to the capacitor terminal 60b, then the diode 62 breaksover permitting current to flow through the rectifier 64 and the winding 34 to energize the control circuits 49 and 50, causing the triodes 24 and 28 to conduct in a manner to be described below. If the terminal 14 is positive with respect to the terminal 12, then the capacitor 60 will charge in the opposite polarity, and when it reaches a predetermined potential, the diode 63 will breakover permitting current flow through the winding 34 to discharge the capacitor 60. When this occurs, current flows in the opposite direction through the timing transformer 34, and the control networks 39 and 40 are energized to render the triodes 22 and 26 conducting. The rectifiers 64 and 65 prevent reverse current from flowing through the diodes 62 and 63, and the rectifiers 43, 47, 53 and 58 will prevent undesired energization of the control circuits 39, 40, 49 and 50, respectively.

It is believed that the remaining details of construction may best be described in the connection with the description of operation which is as follows: Upon closure of the disconnect switches 70 and 72 potential is applied to the input terminals 2 and 4. Oscillation of the network is initiated by a closure and a subsequent opening of the starting switches SW1 and SW2. These switches are shown as being separate switches. If desired, they could be made into a single switch provided, however, that the contacts SW2a and SW2b close subsequent to the closure of the contacts SW1a and open prior to the opening of the contacts SW1a.

The switch SW1 is first closed without effect, and then switch SW2 is closed. Closure of the contacts SW2a and SW2b completes a circuit from the terminal 2 through the current limiting resistor 74, the base b and emitter e of the triode 22, a power rectifier 76, terminal 12, capacitor 60, timing resistor 66, terminal 14, power rectifier 78, current limiting resistor 80, base b and emitter e of the triode 26 to the negative power terminal 4 of the network 1 whereby base current flows in the triodes 22 and 26 causing them to conduct. Immediately thereafter, the switch SW2 is opened, and thereafter the switch SW1 is opened. Opening of the switch SW2 is without effect since base current in the triodes will have substantially ceased when they commenced to conduct. Opening the switch SW1 permits the capacitor 60 to start charging from the potential which will now appear between the terminals 12 and 14 of the network 1. Conduction of the triodes 22 and 26 also results in the energization of the load 20 and the charging of the commutating capacitors 82 and 84. The capacitor 82 is connected between the emitters e of the triodes 22 and 24 in series with a current limiting resistor 86 by the conductors 42 and 52. The capacitor 84 is similarly connected between the collectors c of the triodes 26 and 28 in series with a current limiting resistor 88 by means of conductors 90 and 92.

At the end of a predetermined time interval, the length of which is determined by the setting of the variable resistor 66, the capacitor 60 attains a predetermined potential sufficient to cause the diode 62 to breakover. When this occurs, the capacitor 60 discharges through the primary winding 34 of the timing transformer 30 causing base current to flow in the triodes 24 and 28 whereby they conduct and complete circuits between the terminals 2 and 14, and 12 and 4, respectively.

When the triode 24 became conducting, it completed a circuit from the positive terminal 82a of the capacitor 82 through the current limiting resistor 86, the conductor 42 backwardly through the triode 22, forwardly through the triode 24, and through the conductor 52 to the other terminal 82b of the capacitor 82. The capacitor 82 is of sufficient capacity to momentarily reverse the current through the triode 22 and prevent the occurrence of a substantial forward voltage across the emitter e and collector c of the triode for a predetermined "turn-off" interval. Because of the rectifier 43, current will not flow in the control circuit 39, even though the transformer may be energized, and the triode will, at the end of the critical turn-off interval, remain non-conductive as is explained in greater detail in the said copending application. The reverse current through the triode will be of large magnitude and short duration and will usually not be of sufficient magnitude to completely discharge the capacitor.

In order to limit the reverse voltage across the triode 22, there is provided a shunting circuit comprising a current limiting resistor 94 and a rectifier 96 to provide a shunt path around the triode 22 which also provides a circuit for discharging the capacitor 82. Similarly, conduction of the triode 28 completes a discharge circuit for the commutating capacitor 84 which interrupts the forward current through the triode 26 and which supplies a high magnitude short duration reverse current to render the same non-conductive.

Triode 26 like triode 22 is provided with a shunt circuit comprising a resistor 98 and a rectifier 99 for the purposes explained in connection with the triode 22.

It will now be appreciated that the triodes 24 and 28 are conducting and the triodes 22 and 26 are non-conducting so that the output terminal 14 is being maintained positive with respect to the output terminal 12. The load 20 will be energized with voltage of opposite polarity to that described above with triodes 22 and 26 conducting, and the commutating capacitors 82 and 84 will be charged to opposite polarity.

Capacitor 60 will now charge in the opposite polarity at a rate determined by the variable resistor 66 to determine the length of this half cycle. At the end of a predetermined time interval, the capacitor 60 will again have attained a critical potential to cause the diode 63 to breakover and cause the capacitor 60 to discharge through the primary winding 34 of the transformer 30. Since the current through the primary winding 34 will be in a reverse direction relative to that described above, the polarity of the potentials induced in the windings 35 through 38 will be reversed, and current will flow in the control circuits 39 and 40 to render the triodes 22 and 26 conducting. Conduction of the triodes 22 and 26 results in the triodes 24 and 28 becoming blocked as described above in connection with the rendering of triodes 24 and 28 conducting.

The timing circuit just described provides an extremely steep wave front of current in the control circuits 39 and 40 or 49 and 50 which render the triodes conducting in the shortest interval. The diodes 62 and 63 have a very rapid decrease in impedance upon the occurrence of a critical potential across their electrodes, and the charged capacitor 60 is also at full potential so that when the breakdown occurs the maximum voltage is applied across the terminals of the winding 34. The steeper the wave front applied, the more promptly the triodes turn on. The prompt turn on of the triodes minimizes the short circuit currents during commutation. The prompt turn on also reduces the heat which is developed thereacross. Consequently, a smaller reactor 97 may be utilized and a triode of smaller size may be used without overheating.

In certain instances in FIGS. 2, 3, 4, and 5 elements corresponding to like elements in FIG. 1 have been designated by the same reference characters. In other instances elements corresponding to similar elements of FIG. 1 are designated with a prefix corresponding to the figure number as for example, capacitor 60 of FIG. 1 is 260 in FIG. 2, etc. The same use of designations applies between other figures. For example, resistor 204 of FIG. 2 appears as 304 of FIG. 3. In instances where the foregoing is not true, the elements will be specifically referred to and discussed.

Figure 2:
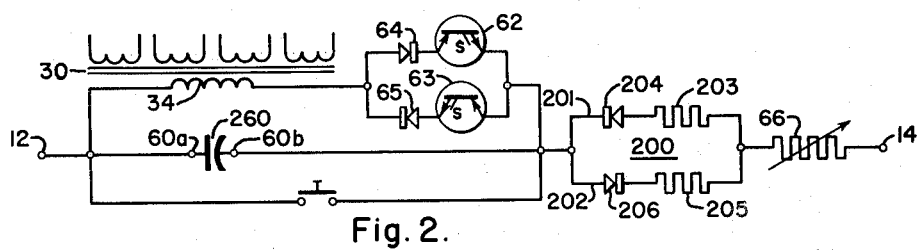
FIG. 2 is a schematic view showing a modified form of the control circuit for the inverter network.

In FIG. 2, there is shown a modified form of charging circuit for the capacitor 260. Unavoidable manufacturing tolarances cause various diodes to have a slightly different operating characteristic including the critical voltage characteristic of its breakdown. Therefore, the use of two diodes, as shown in FIG. 1, under certain operating conditions could lead to a slight unbalance in the alternating voltage which is applied to the load 20. To alleviate this situation, the capacitor 260 is charged at varying rates so chosen that the time interval required to reach each of these different critical voltages is the same.

Charging current for the capacitor 260 flows through a network 200 having two parallel branches 201 and 202. One of these branches comprise a resistor 203 and a rectifier 204, and permits of a first charging rate for the capacitor 260. The other branch 202 includes a second resistor 205 and a second rectifier 206 and permits of a second charging rate. It will be apparent, however, that if both diodes should happen to have exactly the same breakover potential, the network 200 could still be used by making both legs identical.

Figure 3:
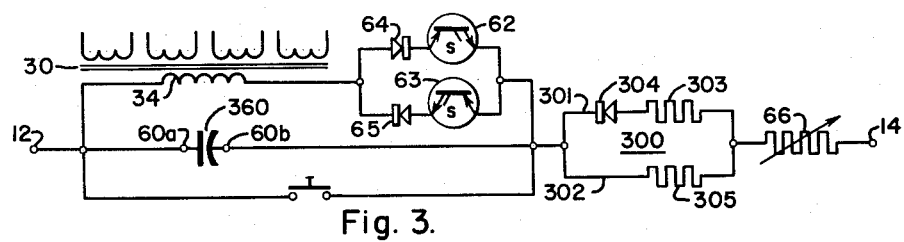
FIG. 3 is a schematic view showing another modified form of the control circuit for the inverter network.

In FIG. 3, there is shown a further modified form of the control circuit in which the network 300 which is similar to the network 200, is provided with branches 301 and a branch 302. The branch 301 is similar to the branch 201 of the network 200. The branch 302 differs, however, from the branch 202 in that the rectifier 206 has been omitted.

In this arrangement charging of the timing capacitor 360 is accomplished in one polarity through solely the branch 302 and in the other polarity through both of the branches 301 and 302. In the network 300 the values of the resistors 303 and 305 are so chosen that the time required for the capacitor to charge to the breakover potential one of the diodes 62 or 63 is the same as is required for charging to the breakover potential of the other diode 63 or 62.

Figure 4:
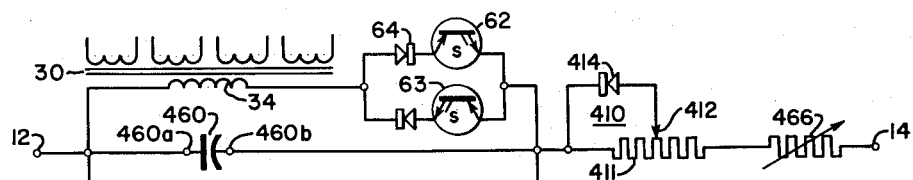
FIG. 4 is a schematic view showing a further form of the control circuit for the inverter network; and, FIG. 5 is a schematic view showing a still further form of the control circuit for the inverter network.

In FIG. 4, there is shown a still further modification in which a potentiometer device 410 and a rectifier 414 has been substituted for the networks 200 and 300. In this form the resistance element 411 of the device 410 is connected in series between the variable resistor 466 and the capacitor 460. A slider 412 of the device 410 is connected through the rectifier 414 to one end of the element 411. As herein shown, it is connected to the end of the element 411 adjacent the capacitor 460.

When the capacitor 460 of FIG. 4 is being charged with its terminal 460a positive with respect to its terminal 460b, all of the charging current flows through all of the element 411. When, however, the capacitor 460 is being charged with its terminal 460b positive with respect to its terminal 460a, current will flow through the rectifier 414 in shunt relationship with a portion of the element 411 and the rate at which the capacitor 460 is charged will be increased. This causes the capacitor 460 to be charged to a slightly higher voltage in the same time interval as is required to charge the capacitor in the other polarity to breakover potential of the diode 62. This compensates for the slightly higher breakdown voltage of the diode 63 with respect to the diode 62. Of course, if the relationship between the diodes 62 or 63 were reversed, the polarity of the rectifier 414 would be reversed.

Figure 5:
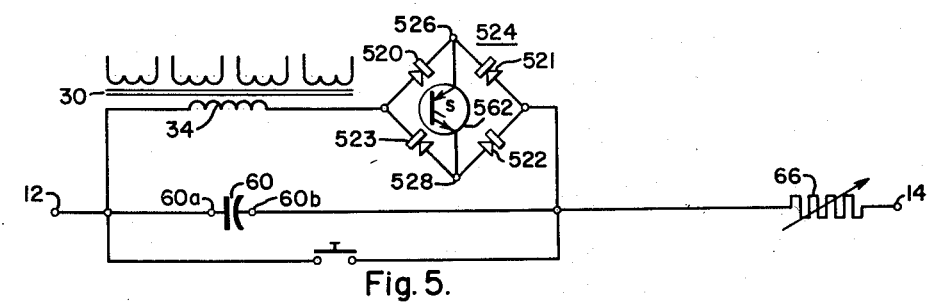

In the form shown in FIG. 5, only a single diode 562 is required. Due to the action of the rectifiers 520—523 of the bridge circuit 524, the terminal 526 is always positive with respect to the terminal 528 irrespective of the polarity at which the capacitor 560 is charged.

While there has been shown only a limited number of forms of the invention, the scope hereof is to be determined solely by the herinafter appended claims as limited only by the prior art.

What is claimed is:

1. In a control system for an inverter network having a pair of network terminals energizable in alternating polarity as a consequence of the conduction of at least one electric valve, a chargeable energy storage device, an impedance device, means connnecting said devices in series between said terminals, a controlling network, a translating means having an input circuit and a plurality of output terminals, and means connecting said network and said input circuit in series circuit, said series circuit being connected across said storage device, said controlling network comprising first and second branches, each said branch including a pair of series connected asymmetric current flow devices, a first of each said asymmetric devices being initially effective to prevent substantial current flow therethrough and thereafter effective to pass substantial current as a consequence of the occurrence of a predetermined critical voltage thereacross, the second of each said asymmetric devices being oppositely poled to conduct current in opposite directions through said controlling network.

2. In a control system for an inverter network having a pair of network terminals energizable in alternating polarity as a consequence of the conduction of at least one electric valve, a chargeable energy storage device, an impedance device, means connecting said devices in series between said terminals, a controlling network, a translating means having an input circuit and a plurality of output terminals, and means connecting said network and said input circuit in series circuit, said series circuit being connected across said storage device, said controlling network comprising first and second branches, each said branch including an asymmetric current flow device and a rectifier, each said asymmetric device being initially effective to prevent substantial current flow therethrough and thereafter effective to pass substantial current as a consequence of the occurrence of a predetermined critical voltage thereacross, said asymmetric devices and said rectifiers being oppositely poled to conduct current in opposite directions through said controlling network and to prevent substantial current flow in directions counted to said opposite directions.

3. In a control system for an inverter network having a pair of network terminals energizable in alternating polarity as a consequence of the conduction of at least one electric valve, a chargeable energy storage device, an impedance device, means connecting said devices in series between said terminals, a controlling network, a translating means having an input circuit and a plurality of output terminals, means connecting said network and said input circuit in series circuit, said series circuit being connected across said storage device, said controlling network comprising first and second branches, each said branch including an asymmetric current flow device, each said asymmetric device being initially effective to prevent substantial current flow therethrough and thereafter effective to pass substantial current as a consequence of the occurrence of a predetermined critical voltage thereacross, said asymmetric devices being oppositely poled to conduct current in opposite directions through said controlling network, and a second controlling network connected in series with said devices, said second network including an impedance element and an asymmetric current flow device controlling current flow through said impedance element.

4. In a control system for an inverter network having a pair of network terminals energizable in alternating polarity as a consequence of the conduction of at least one electric valve, a chargeable energy storage device, an impedance device, means connecting said devices in series between said terminals, a controlling network, a translating means having an input circuit and a plurality of output terminals, means connecting said network and said input circuit in series circuit, said series circuit being connected across said storage device, said controlling network comprising first and second branches, each said branch including an asymmetric current flow device and a rectifier, each said asymmetric device being initially effective to prevent substantial current flow therethrough and thereafter effective to pass substantial current as a consequence of the occurrence of a predetermined critical voltage thereacross, said asymmetric devices and said rectifiers being oppositely poled to conduct current in opposite directions through said controlling network and to prevent substantial current flow in directions counted to said opposite directions, and a second controlling network connected in series with said storage and impedance devices and having a pair of parallelly connected branches, each said parallelly connected branches each including an impedance device and an asymmetric device, said parallelly connected branches being polarized to conduct its major current in opposite directions.

5. In a control system, a pair of terminals adapted to be connected to a source of alternating potential, a capacitor, a resistance, means connecting said capacitor and said resistance in series circuit between said terminals, a transformer having a primary winding, an asymmetric current conducting device adapted to permit current flow therethrough in a forward direction solely subsequently to the potential thereacross reaching a predetermined critical value, said asymmetric device further having the property of conducting in a direction opposite to said forward direction, rectifier means, and means connecting said rectifier means and said asymmetric device and said primary winding across said capacitor for energization by the voltage charge across said capacitor, said rectifier means being poled to prevent current flow through said asymmetric device in said opposite direction.

6. In a control system, a pair of terminals adapted to be connected to a source of alternating potential, a capacitor, a resistance, means connecting said capacitor and said resistance in series circuit between said terminals, a transformer having a primary winding, an asymmetric current conducting device adapted to permit current flow therethrough in a forward direction solely subsequently to the potential thereacross reaching a predetermined critical value, said asymmetric device further having the property of conducting in a direction opposite to said forward direction, a first and a second terminal, a first and a second rectifier connected in series between said first and said second terminals, a third and a fourth rectifier connected in series between said first and said second terminals, all of said rectifiers being poled to conduct current in a direction from said first to said second terminals, means connecting said asymmetric device between said first and said second terminals with said forward direction extending from said second to said first terminals, means connecting a point common to said first and said second rectifiers to one side of said capacitor, and means connecting a point common to said third and said fourth rectifiers to the other side of said capacitor, said last-named means including said primary winding.

7. In a control system for an inverter network, a pair of terminals, circuit means controlling the direction of current flow between said terminals and including at least a pair of electric valves, each said valve including a main power circuit and a control circuit controlling current flow through its said power circuit, said main circuit of one of said valves being effective when conductive to cause current to flow in one direction between said terminals, said main circuit of the other of said valves being effective when conductive to cause current to flow in a second direction between said terminals, a control network connected to actuate said control circuit of said one valve to render its said main circuit conductive as a consequence of current flow in said control network in a first direction and to actuate said control circuit of said other valve to render its said main circuit conductive as a consequence of current flow in said control network in a second direction, a chargeable energy storage device, a current limiting element, means connecting said storage device and said limiting element in series circuit between said alternating potential terminals whereby said storage device is charged in first and second polarities as a consequence of the conduction of said main circuits of said one and said other valves, a voltage sensitive current controlling breakover device adapted to restrain current flow therethrough at voltages below a critical voltage and at voltages above said critical voltage to breakover and permit current flow therethrough, circuit means including said voltage device connecting said control network across said energy storage device, said network being effective as a consequence of a said breakover of said voltage sensitive device to reverse the conductive conditions of said valves.

8. In a control system for an inverter network, a pair of terminals, circuit means controlling the direction of current flow between said terminals and including at least a pair of electric valves, each said valve including a main power circuit and a control circuit controlling current flow through its said power circuit, said main circuit of one of said valves being effective when conductive to cause current to flow in one direction between said terminals, said main circuit of the other of said valves being effective when conductive to cause current to flow in a second direction between said terminals, a control network connected to actuate said control circuit of said one valve to render its said main circuit conductive as a consequence of current flow in said control network in a first direction and to actuate said control circuit of said other valve to render its said main circuit conductive as a consequence of current flow in said control network in a second direction, a chargeable energy storage device, a current limiting element, means connecting said storage device and said limiting element in series circuit between said alternating potential terminals whereby said storage device is charged in first and second polarities as a consequence of the conduction of said main circuits of said one and said other valves, a pair of voltage sensitive current controlling breakover devices, each said breakover device being effective to restrain substantial current flow therethrough at potentials thereacross below a critical potential and of a first polarity and at potentials above said critical potential to breakover and pass substantial current therethrough, circuit means connecting said control network across said energy storage device and including both of said breakover devices, said breakover devices being connected in reverse polarity with respect to said energy storage device whereby one of said breakover devices controls current flow through said control network as a consequence of the occurrence of a potential across said energy storage device of a first polarity and the other of said breakover devices controls current flow through said control network as a consequence of the occurrence of a potential across said energy storage device of a second polarity, said network being effective as a consequence of a said breakover of either of said breakover devices to reverse the conductive conditions of said valves.

9. In an electric inverter, a bridge network having a pair of power input terminals adapted to be connected to a source of unidirectional potential and a pair of output terminals, a plurality of electric valves, each said valve means having a main current path and a control circuit and of the type in which the initiation of current through said main path is controlled by its said control circuit, means individually connecting said main current paths of a first and a second of said valves between one of said input terminals and each of said output terminals, a control network connected to said control circuits of said first and second valves and having a pair of input connections, said control network being effective upon energization to energize said valve control circuits and thereby alter the conductive conditions of said main path of at least one of said valves, an energy storage device, a current regulating device, means connecting said storage device and said regulating device in series circuit, means connecting said series circuit for energization as a function of the potential between said output terminals, a voltage sensitive breakover apparatus adapted to prevent substantial current flow therethrough until subjected to a critical potential after which substantial current may flow therethrough, mean including said breakover apparatus connecting said input connections of said control network across said storage device whereby said control network becomes energized as a consequence of a charged condition of said energy storage device.

10. In an electric inverter, a bridge network having a pair of power input terminals adapted to be connected to a source of unidirectional potential and a pair of output terminals, a plurality of electric valves, each said valve means having a main current path and a control circuit and of the type in which the initiation of current through said main path is controlled by its said control circuit, means connecting said main current paths of a first and a fourth of said valves in series circuit between said input terminals, means connecting said main current paths of a second and a third of said valves in series circuit between said input terminals, means connecting the common point between said first and fourth valves to a first of said output terminals and the common point between said second and third valves to a second of said output terminals, a control network connected to said control circuits of said first and said second and said third and said fourth valves and having a pair of input connections, said control network being effective upon energization in a first polarity to render said main current paths of said second and said fourth valves conducting and in a second polarity to render said main paths of said first and said third valves conducting, an energy storage device, a current controlling device, means connecting said storage device and said controlling device in series circuit for energization as a consequence of current flow through said bridge network, a voltage sensitive breakover apparatus adapted to prevent substantial current flow therethrough until subjected to a critical potential after which substantial current may flow therethrough, means including said breakover apparatus connecting said input connections of said control network across said storage device whereby said control network becomes energized as a consequence of a charged condition of said energy storage device, said control network being connected to said energy storage device in such polarity that when said energy storage device is charged as a consequence of current flow through said main paths of said first and third valves and said breakover apparatus breaks over said control network is energized in its said first polarity and that when said energy storage device is charged as a consequence of current flow through said main paths of said second and fourth valves and said breakover apparatus breaks over said control network is energized in its said second polarity.

11. In an electric inverter, a bridge network having a pair of power input terminals adapted to be connected to a source of unidirectional potential and a pair of output terminals, a plurality of electric valves, each said valve means having a main current path and a control circuit and of the type in which the initiation of current through said main path is controlled by its said control circuit, means connecting said main current paths of a first and a fourth of said valves in series circuit between said input terminals, means connecting said main current paths of a second and a third of said valves in series circuit between said input terminals, means connecting the common point between said first and fourth valves to a first of said output terminals and the common point between said second and third valves to a second of said output terminals, a control network connected to said control circuits of said first and said second and said third and said fourth valves and having a pair of input connections, said control network being effective upon energization in a first polarity to render said main current paths of said second and said fourth valves conducting and in a second polarity to render said main paths of said first and said third valves conducting, an energy storage device, a current controlling device, means connecting said storage device and said controlling device in series circuit for energization as a consequence of current flow through said bridge network, a pair of voltage sensitive breakover valves, each said breakover valve having a forward polarity in which substantial current flow therethrough is prevented until the potential thereacross reaches a critical value after which it breaks down and substantial current may flow therethrough, means connecting said input connections of said control network across said storage device and including said breakover valves connected in antiparallel whereby said control network is energized in its said first polarity as a consequence of said energy storage device being charged by current flow through said first and said third electric valves and in its second polarity as a consequence of said energy storage device being charged by current flow through said second and said fourth electric valves.

References Cited in the file of this patent

UNITED STATES PATENTS 2,917,698     Petrocelli _____ Dec. 15, 1959